(12) United States Patent
Golshani et al.

(10) Patent No.: US 6,594,386 B1
(45) Date of Patent: Jul. 15, 2003

(54) METHOD FOR COMPUTERIZED INDEXING AND RETRIEVAL OF DIGITAL IMAGES BASED ON SPATIAL COLOR DISTRIBUTION

(76) Inventors: Forouzan Golshani, 5346 E. Royal Palm Rd., Paradise Valley, AZ (US) 85253; Youngchoon Park, 4417 N. Saddlebag Trail, #1, Scottsdale, AZ (US) 85251

( * ) Notice: Subject to any disclaimer, the term of this patent is extended or adjusted under 35 U.S.C. 154(b) by 0 days.

(21) Appl. No.: 09/296,228

(22) Filed: Apr. 22, 1999

(51) Int. Cl.$^7$ ................................................. G06K 9/00
(52) U.S. Cl. ........................................ 382/166; 708/203
(58) Field of Search .............................. 382/100, 103, 382/166–167, 171, 209, 232–239, 253–254, 304–306; 341/67, 51; 345/440; 348/384.1, 718, 726–728, 760; 358/426, 432, 450, 515, 517, 518; 708/203, 402

(56) References Cited

U.S. PATENT DOCUMENTS

| | | | |
|---|---|---|---|
| 5,867,112 A | * 2/1999 | Kost | 341/51 |
| 5,892,517 A | * 4/1999 | Rich | 345/430 |
| 5,903,360 A | * 5/1999 | Honma et al. | 358/154 |
| 5,915,038 A | * 6/1999 | Abdel-Mottaleb et al. | 382/209 |
| 5,949,551 A | * 9/1999 | Miller et al. | 358/408 |
| 6,026,215 A | * 2/2000 | Fantone et al. | 345/435 |
| 6,141,006 A | * 10/2000 | Knowlton et al. | 345/335 |
| 6,167,382 A | * 12/2000 | Sparks et al. | 705/26 |
| 6,292,194 B1 | * 9/2001 | Powell, III | 345/430 |
| 6,326,964 B1 | * 12/2001 | Snyder et al. | 345/419 |

* cited by examiner

Primary Examiner—Jayanti K. Patel

(57) ABSTRACT

In the context of image database systems, a method for indexing and retrieval of images by their color content and the spatial distribution of color is disclosed. The method is implemented as a software tool that runs on a personal computer and enables the computer to find a desired image from an image database. The user interface allows the user to describe the desired image, and the tool searches the repository for any images that satisfy the description. The description of the composite image may include information on shapes, texture, presence or absence of objects, and color. The process of search and retrieval of images makes use of a method that determines whether a specific color, or a combination of colors, is present in an image. Further, the method determines the location where the specific color or color combination can be found. By analyzing the results of comparisons between the features found in the composite image and in the stored images, the tool retrieves those images that satisfy the description of the query, image. Calculation of color-related features makes significant use of the calculations that are made in the process of image compression which is an essential step prior to image storage. The process of search and retrieval on the basis of features relating to color are provided via a library of routines that perform the necessary tasks.

14 Claims, 11 Drawing Sheets

```
[DOMAIN KNOWLEDGE]
DOMAIN_NAME = GENERIC_IMAGE_COLLECTION;
[DATABASE]
DATABASE_TYPE = MSACCESS;
ASSOCIATED_DATABASE_NAME = C:\PICDB.MDB;
[GLOBAL_COLOR]
MOST_DISCRIMINANT_ATTRIBUTE = COLOR_HISTOGRAM;
DIMENSION_OF_COLOR_HISTOGRAM = 64;
SIMILARITY_MEASURE = L2;
[TEXTURE]
MOST_DISCRIMINANT_ATTRIBUTE = ENTROPY;
SIMILARITY_MEASURE = L1;
[OBJECT]
MOST_DISCRIMINANT_ATTRIBUTE = FD;
```

FIG. 5

GLOBAL IMAGE ATTRIBUTES

| IMAGE FILENAME | HUE HISTOGRAM | SATURATION HISTOGRAM |

| INTENSITY | HISTOGRAM | DIRECTIONALITY | ENTROPY | CONTRAST |

| KEYWORD DESCRIPTION |

OBJECT SHAPE AND SPATIAL COLOR DISTRIBUTION ATTRIBUTES

| IMAGE FILENAME | OBJECT-ID | MINIMUM BOUNDING BOX | AREA |

| RECTANGULARITY | FOURIER CONTOUR | DOMINANT COLOR | ENTROPY |

| DIRECTIONALITY | KEYWORD DESCRIPTION | LOCATION OF OBJECT |

FIG. 6

METHOD FOR COMPUTERIZED INDEXING AND RETRIEVAL OF DIGITAL IMAGES BASED ON SPATIAL COLOR DISTRIBUTION

FIELD OF THE INVENTION

This invention relates to the field of computers, and more particularly, to storage and retrieval of images by computers. More specifically, it relates to comparison of two images in digital form on the basis of their color contents and color distribution. Still more specifically, the presently preferred embodiment of this invention relates to digital image databases, and the classification, storage and retrieval of images based on spatial distribution of color and other color-related features. In one application of the invention, images may be full color, still pictures, obtained from a digital camera, a scanning machine, or a computer graphics software. PicDB™ is a software tool that implements the methods presented herein.

BACKGROUND OF THE INVENTION

In one aspect, the invention is directed to use with a computer repository constituting a large number of images stored in digital form. Typical applications are a police department's mug shot database containing photographs of criminals, or an on-line fashion catalog that provides computerized access to pictures of existing designs. Conventionally, sequential browsing was the only method for finding a desired image (i.e., one that satisfies a set of criteria) from the large collection. The search process was simplified by performing some type of pre-processing on images. However, the pre-processing is costly and inflexible. Moreover, in many cases, the desired image may embody characteristics that were not foreseen in the pre-processing phase. Furthermore, information on the existence of a color combination and the location of each color have not been used effectively in the process of search and retrieval of images.

In the traditional style of image management and retrieval, each file containing an image was assigned an identifier, and retrieval of images was on the basis of the identifier. The retrieval process was made more efficient by selecting a meaningful tag rather than a simple, numerical identifier. The problem with this method was that the exact identifier of the desired image had to be known in order to retrieve it. A rather important improvement was the idea of storing the attributes of each image along with the image itself. Such attributes, for example, an English description of what the image is about, were indexed and stored in a simple relational database. This technique, known as content description, is important and indispensable to the task of image retrieval. However, such descriptions are only subjective interpretations of the contents and can capture just a fraction of the many facets of the information that is potentially obtainable from an image.

The foregoing problems have been overcome in part by resorting to indexing systems that associate a set of indexes to each image on the basis of the features that can be found in that image. The existence or non-existence of features of interest is the guiding principle for retrieving the right set of images from the database. In order that the system can deal with unforeseen queries (i.e., those not catered to by the original classification algorithm), a new set of techniques, referred to as retrieval by content, are proposed. In this approach, the retrieval process is not bound to predefined attributes, and many more types of queries can be posed to the image database. This invention relates to a method of content-based indexing and retrieval technique on the basis of color combination and the area of the image in which certain colors are present. These methods are implemented in conjunction with an image database system called PicDB.

OBJECTS OF THE INVENTION

It is therefore a broad object of this invention to provide a computer repository for storing digital images in such a way that the visual contents of each image, particularly the existence and the location of any combination of colors in that image, are used for classification, indexing and identification and retrieval of that image.

Another object of this invention is to enhance the performance of image database systems by making use of features relating to color distribution in the process of search and retrieval.

It is a more specific object of this invention to provide users of image database systems, for example PicDB, with the capability of querying the database on the basis of colors that appear in specific areas of images contained in the database.

SUMMARY OF THE INVENTION

Briefly, these and other objects of the invention are achieved by a software tool that takes as input: I) the specification of a color or a set of colors, II) the specification of approximate coordinates of where those colors should occur, and III) a set of images that are stored in computer's disks; and outputs a subset of the given images (III) that satisfy the color criteria specified in (I) and (II). This software is incorporated into a comprehensive process for storage and retrieval of digital images where images are first compressed by an algorithm provided by the JPEG standard prior to being stored. Some of the computations necessary for the current invention are derived directly from the values that the JPEG algorithm provides. Therefore the tool imposes a minimal overhead on the operation of the image database system that makes use of it. This invention allows the users of image databases systems to retrieve the desired images by their color contents.

DESCRIPTION OF THE DRAWING

Other objects, features and advantages of the invention will be readily apparent from the following description of a preferred embodiment thereof although variations and modifications may be effected without departing from the spirit and scope of the novel concepts of the disclosure, and of which:

FIG. 5 illustrates an example of knowledge stored in the Knowledge base of the image repository;

FIG. 6 is an illustration of a feature list that is stored in the feature database;

DESCRIPTION OF THE PREFERRED EMBODIMENT(S)

Image database systems require techniques that can classify images, filter relevant information, and retrieve images from a potentially large set of stored image based on similarities with the user's given query image. They must go beyond the traditional capabilities of database systems and must incorporate a variety of non-textual data. Storage and retrieval are more costly due to the volume image data and therefore require supporting methods for rapid and efficient for processing. For indexing and retrieval, both text based techniques and "image property based" techniques are provided. For the text-based approach, a set of keywords, or a set of descriptive sentences are used. Most database management systems, particularly relational ones, can provide management and retrieval capabilities. The process of determining appropriate keywords or descriptive text annotation for a given image can be partially automated and human intervention is necessary. With content-based indexing and retrieval techniques, the system uses visual information extracted from of images, such as color histograms, scene complexities, texture and object shapes. Content-based image retrieval systems find and retrieve a set of images from the database that satisfy the similarity criteria of the given query.

Figure 1:
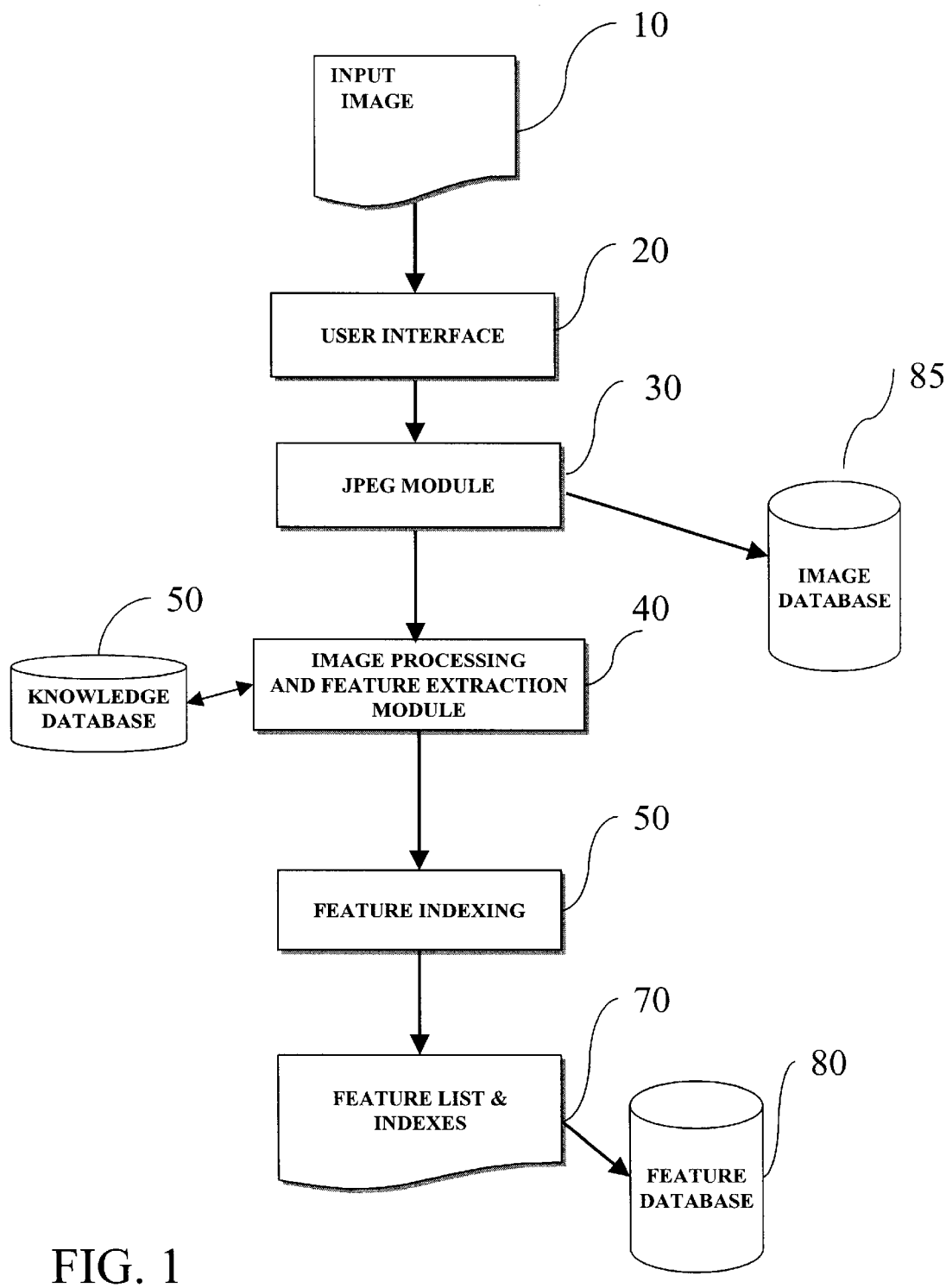
FIG. 1 is a representation of an exemplary image database system with the important components identified.

Referring to FIG. 1, when a new image 10 is presented to the user interface of the image database system 20, it is compressed by the JPEG module 30. Next, a collection of image processing and feature extraction routines, grouped together in Feature Extraction Module 40, elicit a series of features specific to the given image. This process, which is more extensively discussed below, makes use of the Knowledge Database 50 that contains the necessary information for intelligent processing. Once the appropriate features are extracted by Module 40, they are indexed by the Feature Indexing module 60, the output of which is a list of features and their indexes 70. The feature list and the indexes 70 are then stored in a Feature Database 80, which is the repository of registered images and their features. Image 10 may be in any format, including, but not limited to, JPEG, GIF and bitmap. The user interface 20 is more completely illustrated in FIG. 2. In FIG. 3, the JPEG algorithm is shown in a step by step manner. Details of the Feature Extraction Module 30 is presented in FIG. 4. FIG. 5 illustrates an example of the information contained in Knowledge Database 40. An example of a feature list 70 is shown in FIG. 6. Database 80 may be any commercially available database system, such as Oracle® or Sybase®, that is capable of storage and retrieval.

Figure 2:
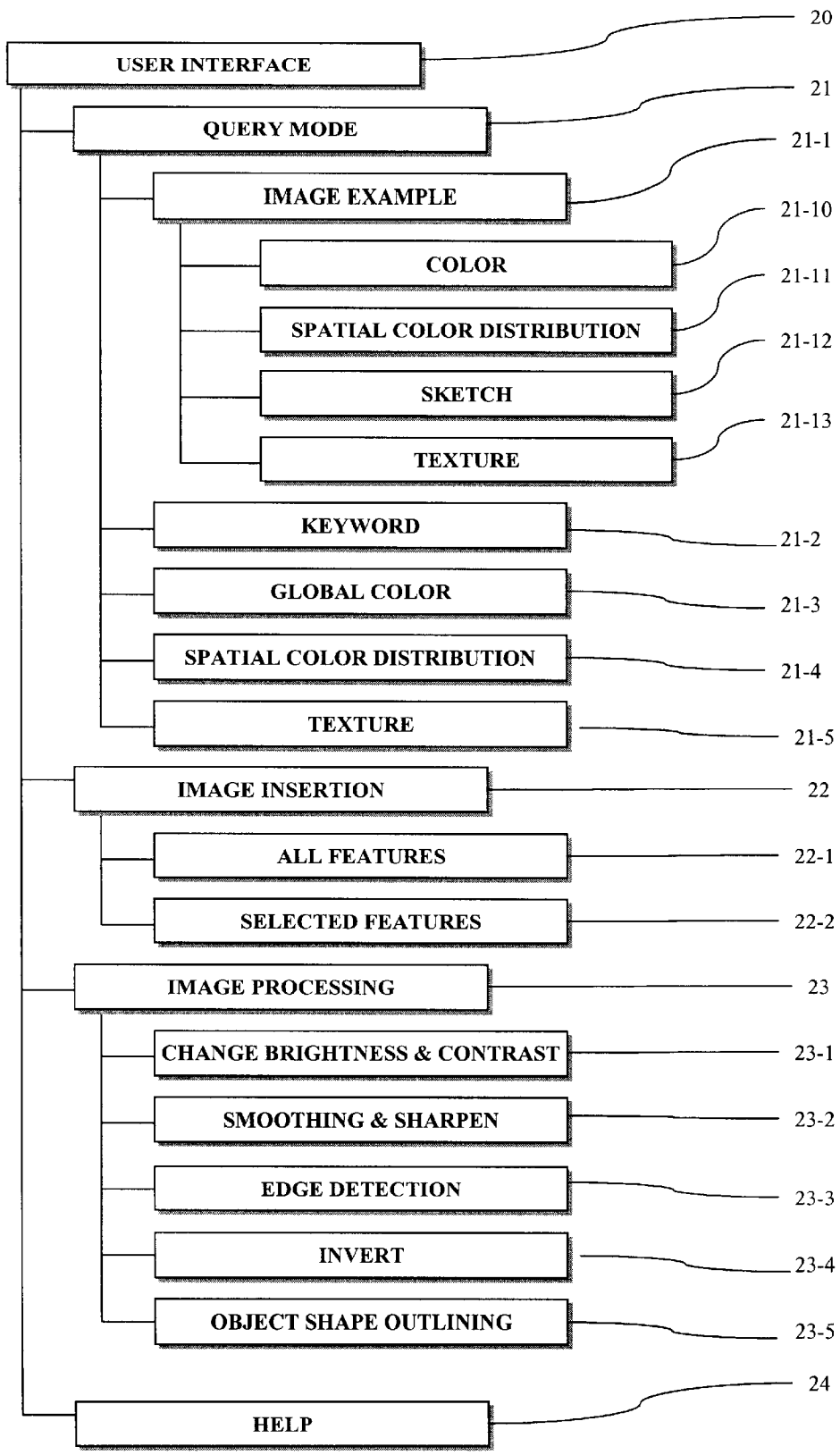
FIG. 2 is a high level architectural diagram of the user interface of the system that implements the methods described herein.
Figure 3:
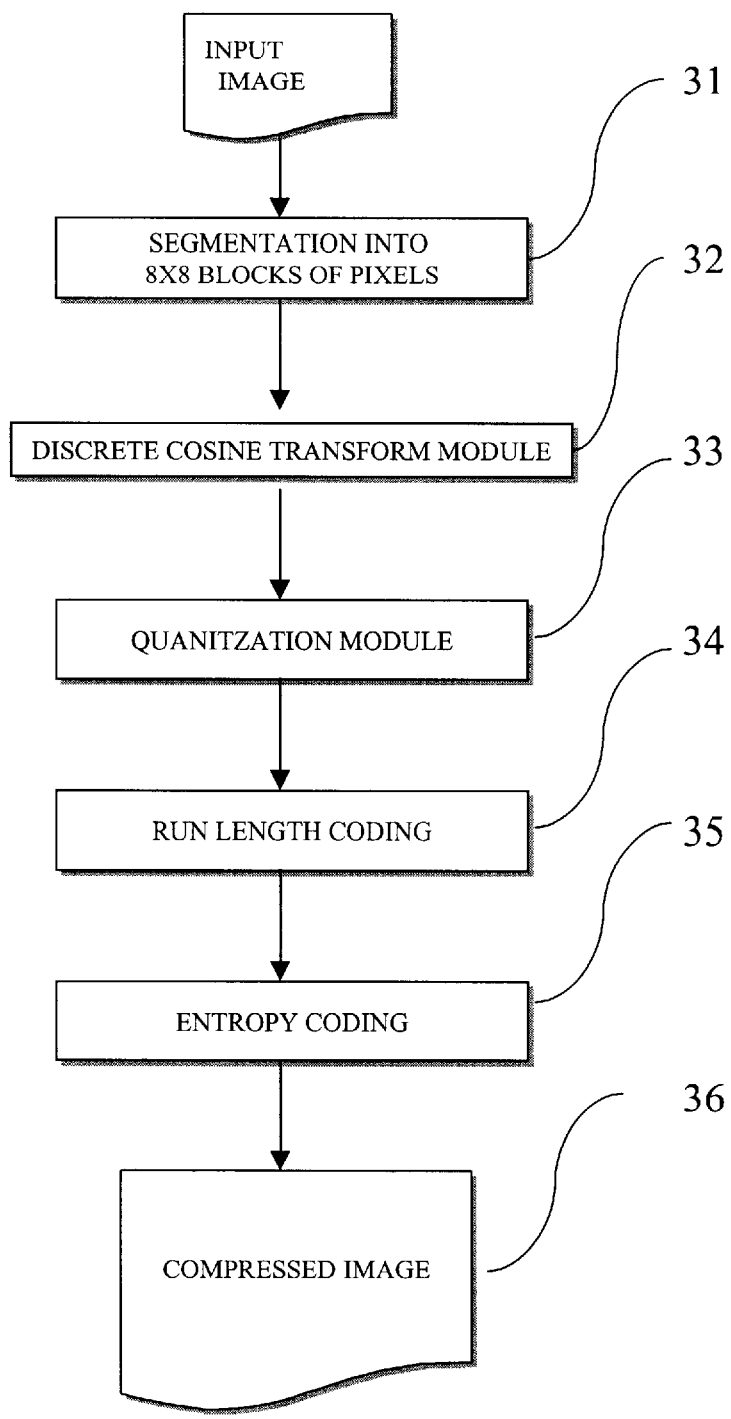
FIG. 3 illustrates the JPEG algorithm for compression of images into a smaller size so that a lesser number of bytes will be used for the storage of images on the disks of the computer. The JPEG algorithm provides some of the values that are used by the current invention.

Referring now to FIG. 2, which is a high level architectural diagram of the user interface, it will be understood that the interface is a menu-based interactive module through which all of user's commands are given to the repository program. Four main menus are: the query mode menu 21, the image insertion menu 22, the image processing menu 23, and the help menu 24. Under query mode menu 21, there are several option menus, namely, example image menu 21-1, keyword menu 21-2, global color menu 21-3, spatial color distribution menu 21-4, and texture menu 21-5. Some of these menus have even more detailed menus. For instance, the example image menu leads to three other menus. Each menu is designated for a particular type of input, namely, color 21-10, spatial color distribution 21-11, sketch 213 12, and texture 21-13. When interacting with the system, the user navigates to the appropriate menu and enters the required information for invoking the desired command.

Figure 4:
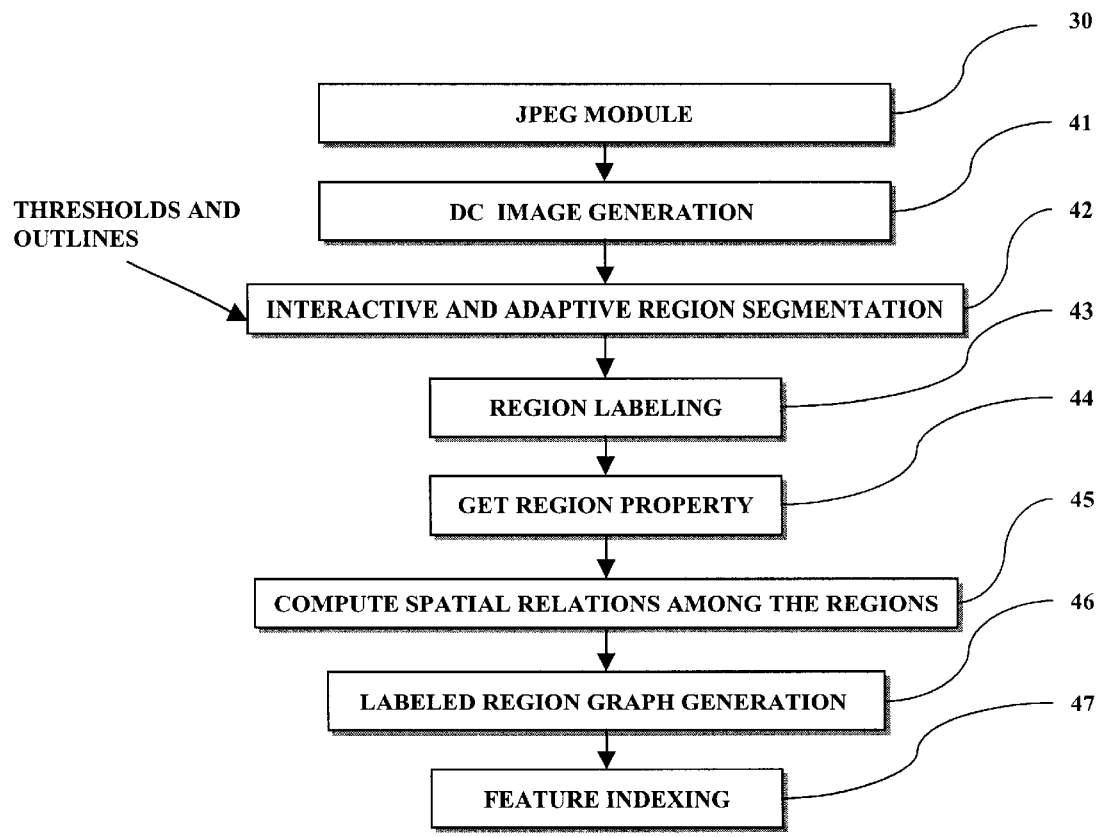
FIG. 4 presents a high level flow chart of the steps implemented in the Feature Extraction Module.

Referring now to both FIG. 3 and FIG. 4 and as best shown in FIG. 3, JPEG is a well known algorithm for compression of still images that reduces the size of each image so that fewer bits will be used for storing the image on the computer storage devices. The given image is first segmented into blocks of 8 by 8 (for a total of 64) pixels by the segmentation module 31. Discrete Cosine Transform 32 is then performed on each of the 64 pixel blocks to produce a matrix of 64 coefficients, of which one is called the DC value and the rest are called AC values. The next process is the rounding off of the coefficient by the Quantization module 33. Next, run length coding 34, which counts the number of similar values and represents them by their count, is performed. Finally entropy coding 35 is performed to produce a compressed image 36.

Referring to FIG. 4, the input to the Feature Extraction Module are the coefficients, more specifically, the DC value and the AC values that the Discrete Cosine Transform routine 32 of the JPEG module generates. In step 41, by using the DC values of all of the blocks of the image, a DC image which is a degenerated version of the original image is created. Region segmentation 42 is next performed on the basis of a set of thresholds and outlines. This process identifies regions of the image that have similar colors, where similarity is measured by the given thresholds. In step 43, these regions are labeled, and their properties are extracted in step 44. Next, the spatial relationships among all of the regions are computed by routine 45, and a labeled graph identifying each of the regions is created in step 46. This graph is a high level representation of color distribution in the image. All region information and spatial relations are then passed on to the Feature Indexing module 60 as identified in FIG. 1.

Referring now to FIG. 5 and FIG. 6, samples of the information contained in the databases are presented. FIG. 5 illustrates sample information in the Knowledge Database 50 in the form of list of attributes and their respective values. FIG. 6 shows an example of Feature Lists that are Indexed and stored in the Feature Database 80. The Feature list consists of two attribute lists. One is the Global Image Attributes which has eight fields, namely: Image File Name, Hue Histogram, Saturation Histogram, Intensity Histogram, Directionality, Entropy, Contrast, and Keyword Description. The other is Object Shape and Spatial Color Distribution Attributes, with eleven fields for Image File Name, Object-ID, Minimum Bounding Box, Area, Rectangularity, Location of Object, Fourier Descriptor of Contour, Dominant Color, Entropy, Directionality, Keyword Description.

Figure 7:
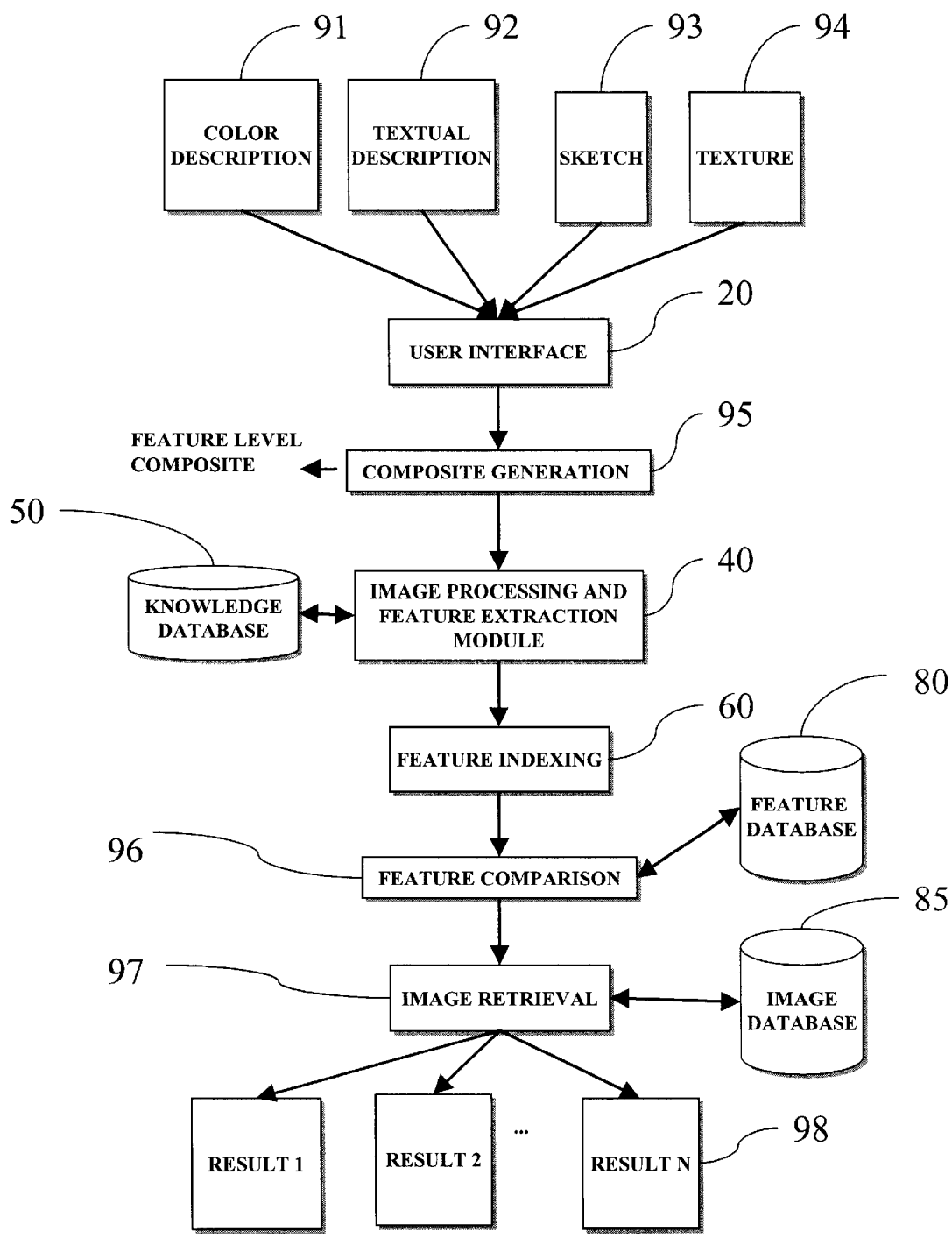
FIG. 7 is a flow chart of the steps of the process for retrieval of images based on their given color contents.

In FIG. 7, the process of image retrieval is presented more elaborately. The user may provide any information that is known about the desired image, and the system will search the database for all those images that satisfy the given clues either completely or partially. The user interface 20 provides a number of windows that can be used by the user to enter the query criteria. For example, color and color distribution information can be entered through the window designated for color distribution 91. Textual descriptions are entered in Textual Description window 92. The next window 93 is a sketchpad by which the user can present a sketch of the desired image.

Figure 9:
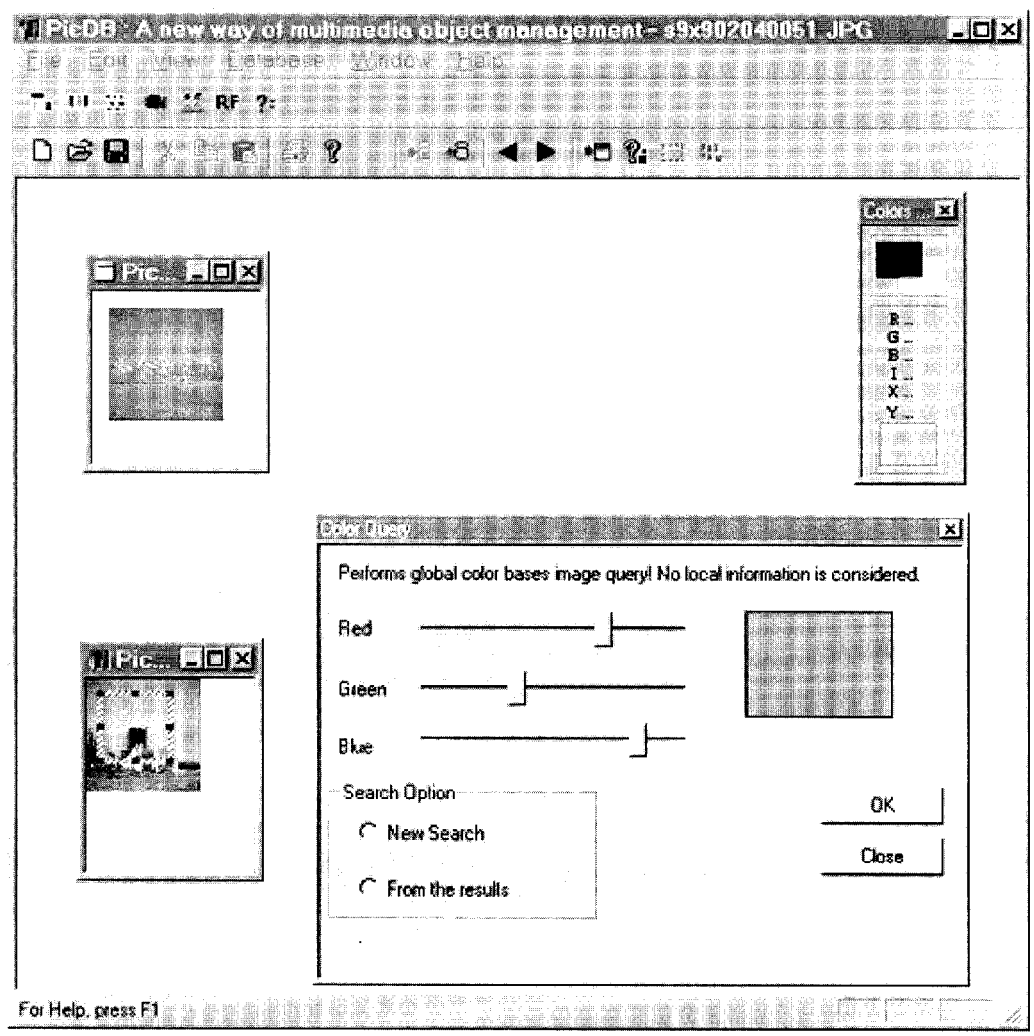
FIG. 9 illustrates the appearance of the monitor of the computer system displaying the windows of the user interface for specifying the attributes of the desired image with the large window at the bottom right corner specifying the color information.
Figure 10:
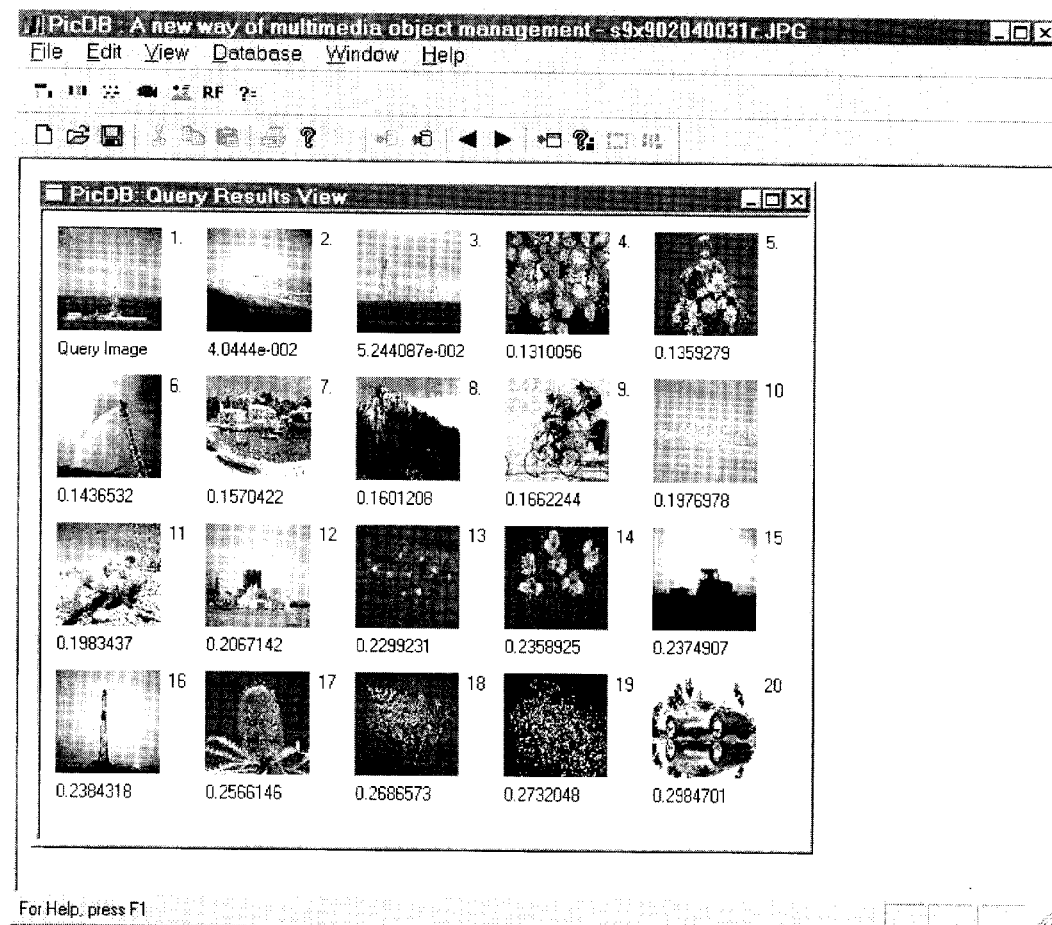
FIG. 10 illustrates the appearance of the monitor of the computer system with the results of a query displayed in the window named "PicDB: Query Results View".

Similarly, any texture information is entered into the window labeled Texture 95. An illustrative example of the user interface is presented in FIG. 9. The user interface 20 then gathers the query information and passes it to the Composite Generation module 95 which generates a composite of the desired image. The composite is then passed on to the Feature Extraction Module 40. As stated in the presentation of FIG. 1, features are extracted in conjunction with the information available in Knowledge Database 50, and are then indexed by Feature Indexing module 60. The next step 96 is the process of comparison of the features of the images so that the correct images can be identified. All images that satisfy a significant portion of the criteria are identified and are retrieved from the image database. 85 by the Image Retrieval module 97. These images are then ranked with respect to their closeness to the desired image, and are presented as result-1, result-2, . . . in the RESULTS window 98. FIG. 10 is an example of such a ranked set of images.

Figure 8A:
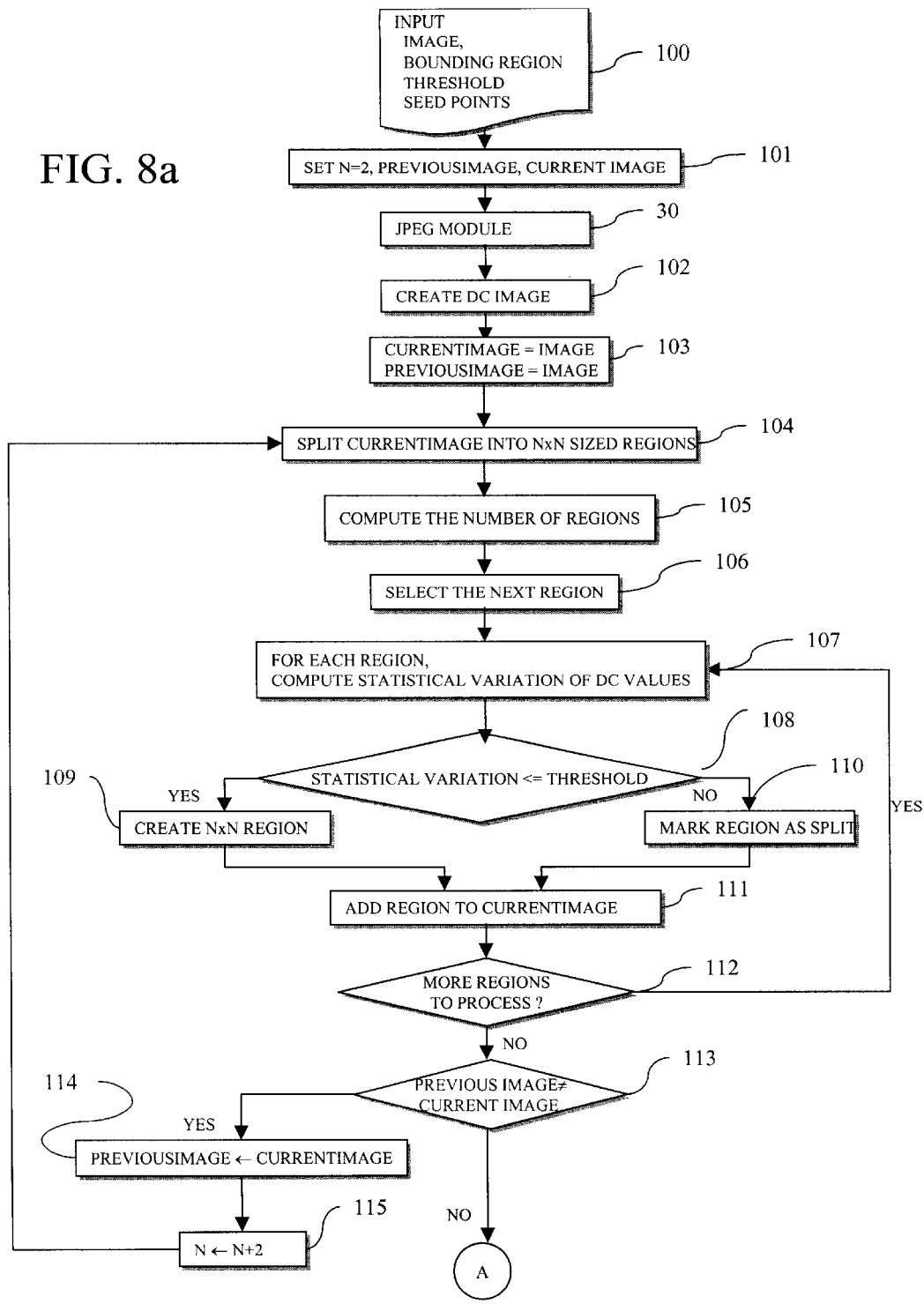
FIG. 8 is a detailed flow chart of the steps of the algorithm for the extraction of information on spatial color distribution.
Figure 8B:
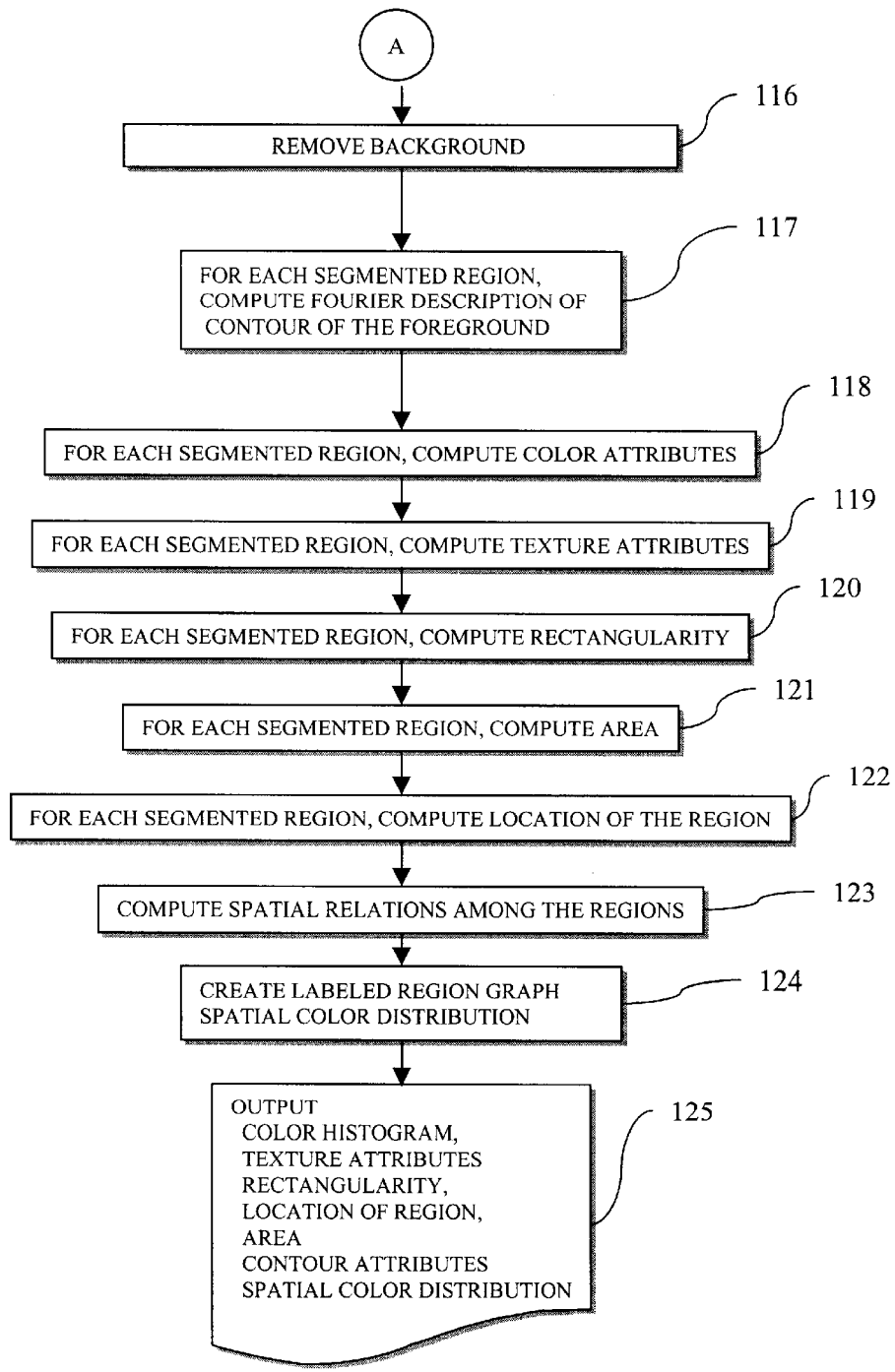

Referring now to FIG. 8, the process of extraction of information on spatial distribution of color in the image is presented in detail. This is a more detailed flowchart of the process that was presented at a high level in FIG. 4. The input 100 to this process is an image, Bounding Region, Threshold, and Seed Points. In step 101, variables are set to their initial values. N represents block size of regions, and PreviousImage and CurrentImage are two variables referring to images. The input image then goes through the JPEG Module 30, and then a DC image is created in step 102. The DC image has a reduced size and reduced resolution compared to the original image. In step 103 two variables, namely CurrentImage and PreviousImage, are set to the DC image. In step 104, CurrentImage is split into regions of size N×N. Since the initial value of N was set to 2, the initial size of the regions would be 4. The number of regions is then determined in step 105 by a simple counting procedure. A region is selected in step 106 and the statistical variations among the DC values of its N×N block are calculated in step 107. These variations are then compared with the given Threshold in step 108. It will be observed that the value of Threshold was one of the input parameters to this flowchart. If the statistical variation is less than or equal to the Threshold, the N×N blocks of the region are merged together in step 109, otherwise, the region is marked as split in step 110. In step 111, the new region is added to CurrentImage.

At step 112, a check is made to determine if all regions have been processed. If there are more regions to process, the algorithm will go to step 106, and a new region is selected. If there are no more regions, PreviousImage and CurrentImage are compared. If they are not equal, the value of CurrentImage is assigned to PreviousImage in step 114, the value of N is increased by 2 in step 115, and the process of splitting CurrentImage into regions of size N×N, step 104, begins again. However, should the test in step 113 determine that PreviousImage and CurrentImage are the same, then no further iteration of the loop 104–113 is required and the algorithm proceeds to step 116 which removes the background of the regions so that only the foreground, i.e., the objects, are kept.

In step 117, the Fourier description of each of the segmented regions is computed. Similarly, in steps 118 through 122, color attributes, texture attributes, rectangularity, area and location of each region is computed. Spatial relationship among the regions is then computed in step 123, and the regions are labeled in step 124 so that a graph representing the spatial color distribution is generated. The computed values, namely, color histogram, texture attributes, rectangularity, area, location of each region, contour attributes, and spatial color distribution, are the output of this process.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A method by which a computer system comprising:
   a) a repository of color images
   b) an input channel for importing color images, and
   c) a computer terminal for user interaction, for extracting color information and spatial color distribution information from a given color image, storing the said image in the image repository and indexing the color related information for future retrieval, comprising the steps of:
      (a) receiving the given image;
      (b) breaking the image into blocks of 8×8 pixels;
      (c) compressing each block into a standard format known as JPEG and extracting key coefficients DC and AC values;
      (d) repeatedly comparing the DC values of the adjacent blocks to determine whether regions of similar intensity can be formed;
      (e) indexing the information on color and its spatial distribution; and
      (f) storing the image, its features, and the extracted color information in the image repository.

2. The method of claim 1 when the image is in any format including TIFF, GIF, PCX, TGA, BMP and JPEG2, each of which is a different way of encoding images.

3. A software tool for storage and retrieval of images that incorporates the method of claim 2 by implementing a library of software routines that execute the said method.

4. The method of claim 1 in which the input is heterogeneous information on a desired target image presented to the computer system through the visual interface providing windows for textual information, color information, sketches and texture information, and the output is a ordered list of images that satisfy the given criteria, comprising the steps of:
   (a) receiving information from any of the user interface windows designated for inputting: textual information color, position of color, shape, and texture;
   (b) creating a composite image representing all of the information obtained from the user interface windows listed in 3(a);
   (c) breaking the composite image obtained in 3(b) into blocks of 8×8 pixels;
   (d) compressing each block into a standard format known as JPEG and extracting key coefficients DC and AC values;
   (e) repeatedly comparing the DC values of the adjacent blocks to form regions of similar intensity;
   (f) indexing the information on color and its spatial distribution;

(g) comparing the images contained in the image repository and their attributes and indexes with the composite image, its attributes and indexes in order to find complete or partial match;

(h) ranking the results obtained in step 3(g) in the order of closeness to the composite image obtained in 3(b); and (i) displaying the images in the order of ranking on a window of the user interface.

5. The method of claim 4 in which other information including date and author may be also provided through a window of the user interface.

6. A software tool for storage and retrieval of images that incorporates the method of claim 5 by implementing a library of software routines that execute the said method.

7. The method of claim 4 in which a message indicating that there are no possible matching images in the image repository is displayed on a window of the user interface when the step 3(g) does not find a complete or partial match for the composite image.

8. A software tool for storage and retrieval of images that incorporates the method of claim 7 by implementing a library of software routines that execute the said method.

9. A software tool for storage and retrieval of images that incorporates the method of claim 4 by implementing a library of software routines that execute the said method.

10. A software tool for storage and retrieval of images that incorporates the method of claim 1 by implementing a library of software routines that execute the said method.

11. A method by which a computer system comprising:

a) repository of color images b) an input channel for importing color images, and c) a computer terminal for user interaction, for extracting color information and spatial color distribution information from a given color image, storing the said image in the image repository and indexing the color related information for future retrieval, comprising the steps of:

(a) receiving the given image;

(b) compressing each block into a standard format known as JPEG and extracting key coefficients DC and AC values;

(c) repeatedly comparing the DC values of the adjacent blocks to determine whether regions of similar intensity can be formed;

(d) indexing information on color and its spatial distribution; and (e) storing the image, its features, and the extracted color information in the image repository.

12. The method of claim 11 in which the input is heterogeneous information on a desired target image presented to the computer system through the visual interface providing windows for textual information, color information, sketches and texture information, and the output is a ordered list of images that satisfy the given criteria, comprising the steps of:

(a) receiving information from any of the user interface windows designated for inputting data selected from the following group: textual information, color, position of color, shape, or texture;

(b) creating a composite image representing all of the information obtained from the user interface windows listed in 12(a);

(c) indexing information on color and its spatial distribution; and (d) comparing the images contained in the image repository and their attributes and indexes with the composite image, its attributes and indexes in order to find complete or partial match.

13. The method of claim 11 comprising the further steps of:

(a) compressing the composite image created in step 12(b) into a standard format known as JPEG and extracting key coefficients DC and AC values; and (b) prior to indexing said information on color and its spatial distribution, repeatedly comparing the DC values of the adjacent blocks to form regions of similar intensity.

14. The method of claim 13 comprising the further steps of:

(a) ranking the results obtained in step 12(d) in the order of closeness to the composite image obtained in 12(b); and (b) displaying the images on a window of the user interface.

* * * * *